UNITED STATES PATENT OFFICE.

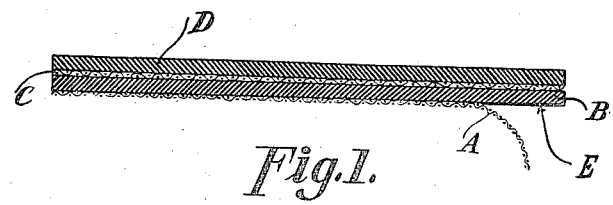
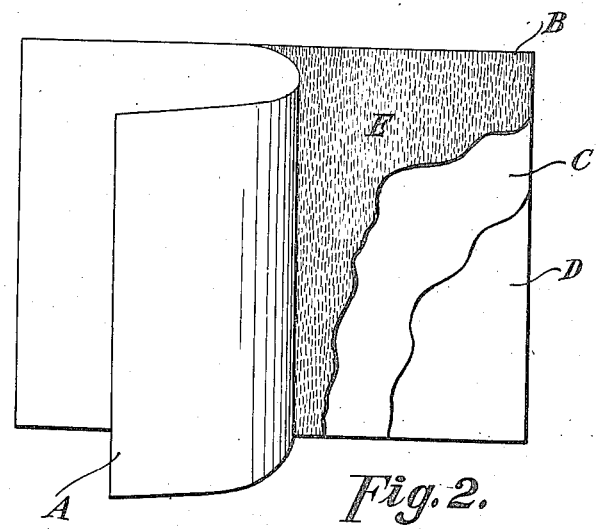
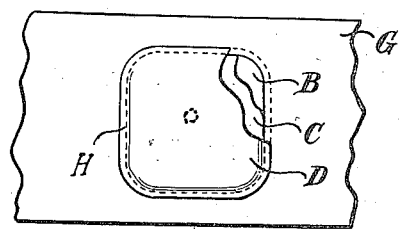
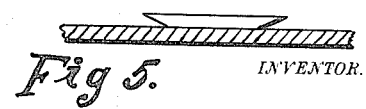

CLARENCE O. DUFFY, OF DALLAS, TEXAS.

QUICK TIRE-PATCH FOR PNEUMATIC TIRES.

1,290,128.　　　　　　Specification of Letters Patent.　　Patented Jan. 7, 1919.

Application filed December 15, 1916.　Serial No. 137,090.

*To all whom it may concern:*

Be it known that I, CLARENCE O. DUFFY, a citizen of the United States of America, residing at Dallas, in the county of Dallas and State of Texas, have invented certain new and useful Improvements in Quick Tire-Patches for Pneumatic Tires, of which the following is a specification.

This invention relates to a new and useful form and design of quick tire patch or cold patch as sometimes referred to by those conversant with the art, and is a patch highly adaptable and serviceable for use and in connection with the repair of automobile tires, tubes of all kinds and sizes used in connection with casings or otherwise, where it is desired to patch or repair punctures and blow-outs.

A purpose of the invention is to provide an adhesive repair patch positive in its properties of adhesion, easy and convenient of application and one which may be used immediately after application of said patch to the repaired parts on the tube, thus obviating the necessity of waiting for the parts to dry, or waiting for vulcanizing processes. The invention also contemplates and discloses a certain form in molding and construction of individual patches, and especially appertains to a particular form of edge shaped to best adhere in its application to the tube to be repaired.

A further object of the invention is to provide a form of tire patch which will be constructed of a plurality of layers of adhesive material, and one which will readily receive a second repair patch thereover or applied upon same in cases desired to repair a puncture or hole in the tube located closely to a first or original patch.

With the above and further objects in view the invention has relation to a certain combination and arrangement of plastic adhesive materials calculated to provide a highly efficient form of tire patch an example of which is described in the following specification, pointed out in the appended claim and illustrated in the accompanying drawings, wherein;

Figure 1 is a cross sectional view of the several adhesive layers of material which constitute the tire patch here disclosed.

Fig. 2 is a view of a portion of the material which comprises this invention and from which material is cut patches of any desired size best adapted to repair the tire. This view shows some of the materials broken away, and shows one coating partly stripped off.

Fig. 3 is a view illustrating the patch with portions broken away applied to the tire.

Fig. 4 is a cross sectional view of a portion of a rubber tube, illustrating the application of one repair patch over another.

Fig. 5 illustrates the formation and construction of the shape of the patch around the periphery thereof.

Referring now more in particular to the several views of the drawing, wherein the same reference characters are used to designate identical parts, the reference characters B, and D, designate the two principal body constituents comprising the adhesive patch constituting this invention. A substantially strong fabric layer C is interposed between the body layers B and D and serves to reinforce and strengthen the patch throughout, the body portions B and D of the patch being slightly vulcanized and impregnated into the fabric fiber C, thus forming one solid patch with the layer of fabric C contained in the rubber or plastic materials B and D. A protective coating of fabric A is applied to the outer surface E of the patch. In the manufacture of this form of patch the fabric A is applied to the surface E of the patch with a view of protecting and keeping clean and preserving the adhesive properties of said patch prior to its application to the tire.

In the use and application of this quick patch in repairing automobile tubes the part around the hole or rupture in the tire to be repaired is first thoroughly cleaned by abrasion of the surface, which may be performed by sand papering said surface about the rupture to be repaired. The rubber cement is then applied to the parts cleaned and sand papered and slightly smoothed out about the parts cleaned. The patch is then cut from the material as described, constituting this invention, and the protective fabric A stripped therefrom and the patch applied to the glued portion of the tube. The surface E of the patch being in a very plastic condition and adhesive to a high degree, readily adheres to the glued parts rendering it impossible to remove the patch from the tube after said patch has been pressed into the tube thoroughly by kneading and working constant pressure of the patch to the tube.

Fig. 2 shows the material with the protective fabric coating partly stripped from the material showing the adhesive and highly plastic surfaces E. The layer D of the patch formation will preferably be made of slightly vulcanized rubber so that another patch, if applied to the said surface, will become firmly fixed thereto through a process of slow natural vulcanization which occurs when the tire is heated by friction and traction with the ground.

Fig. 5 shows a particular form and shape of the edge of one form of the patch included in this invention, which patch is seen to have an angular formation. The patch in its application to the tube as illustrated in Fig. 5 is incomplete in its fixation to the tube in that the angular edges H have not been pressed and kneaded down upon the tire. After the edges are pressed down and into the pores and fabric of the rubber tube the patch in its application to the tube will assume the form and shape of an ovaled edge patch, as illustrated in Figs. 3 and 4. Fig. 4 shows the manner and application of one patch over another, where it is desired to patch a rupture or hole in a tube formed close to a first or original patch. Fig. 3 illustrates the ovaled formed edge of the patch in a manner turned down and over against a tube, the dotted lines H indicating the inner edge or portion of the patch with the outer edge kneaded over and ovaled down, leaving the patch round and free from perpendicular edges or surfaces, which will obviate and avoid any tendency to catch or strip the patch from the tire or tube.

The invention is presented to include all such modifications and changes in shape, formation or construction as may be contemplated to come within the purview of the following claim:

Claim:

In a tire patch, a patch manufactured with an edge beveled and formed on an angle with the surface to be applied, said angular edges being of adhesive material so that their surfaces will adhere to the surface upon which the patch is applied thereby leaving a smooth beveled surface without evidence of edges to become loosened up and peel off.

In testimony whereof I have hereunto set my hand this 12th day of December A. D. 1916.

CLARENCE O. DUFFY.

Witnesses:
 CLARENCE CARPENTER,
 J. C. LEDBETTER.